Aug. 25, 1970    M. G. DREYFUS    3,525,568
AIRBORNE ELECTRO-OPTICAL SYSTEMS AND APPARATUS FOR
INDICATING TRUE AIRCRAFT VELOCITY AND ALTITUDE
Filed Dec. 11, 1967    2 Sheets-Sheet 1
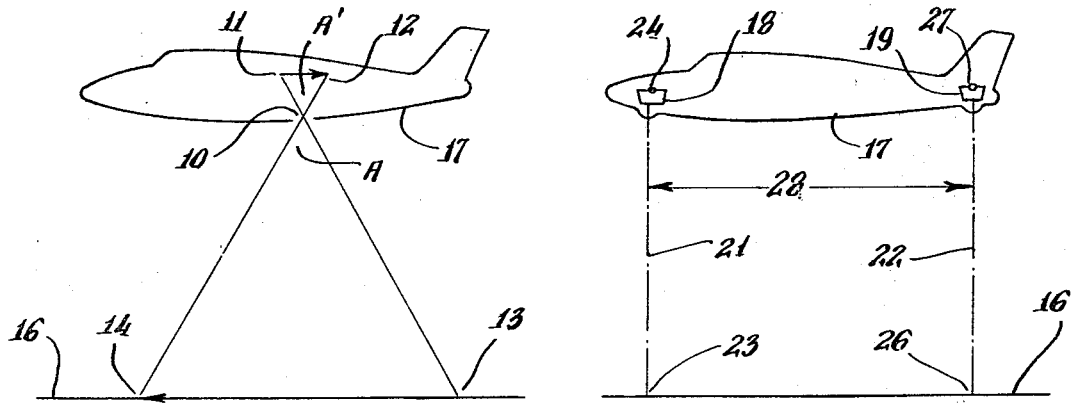
Fig. 1.
(PRIOR ART)
Fig. 2.
(PRIOR ART)
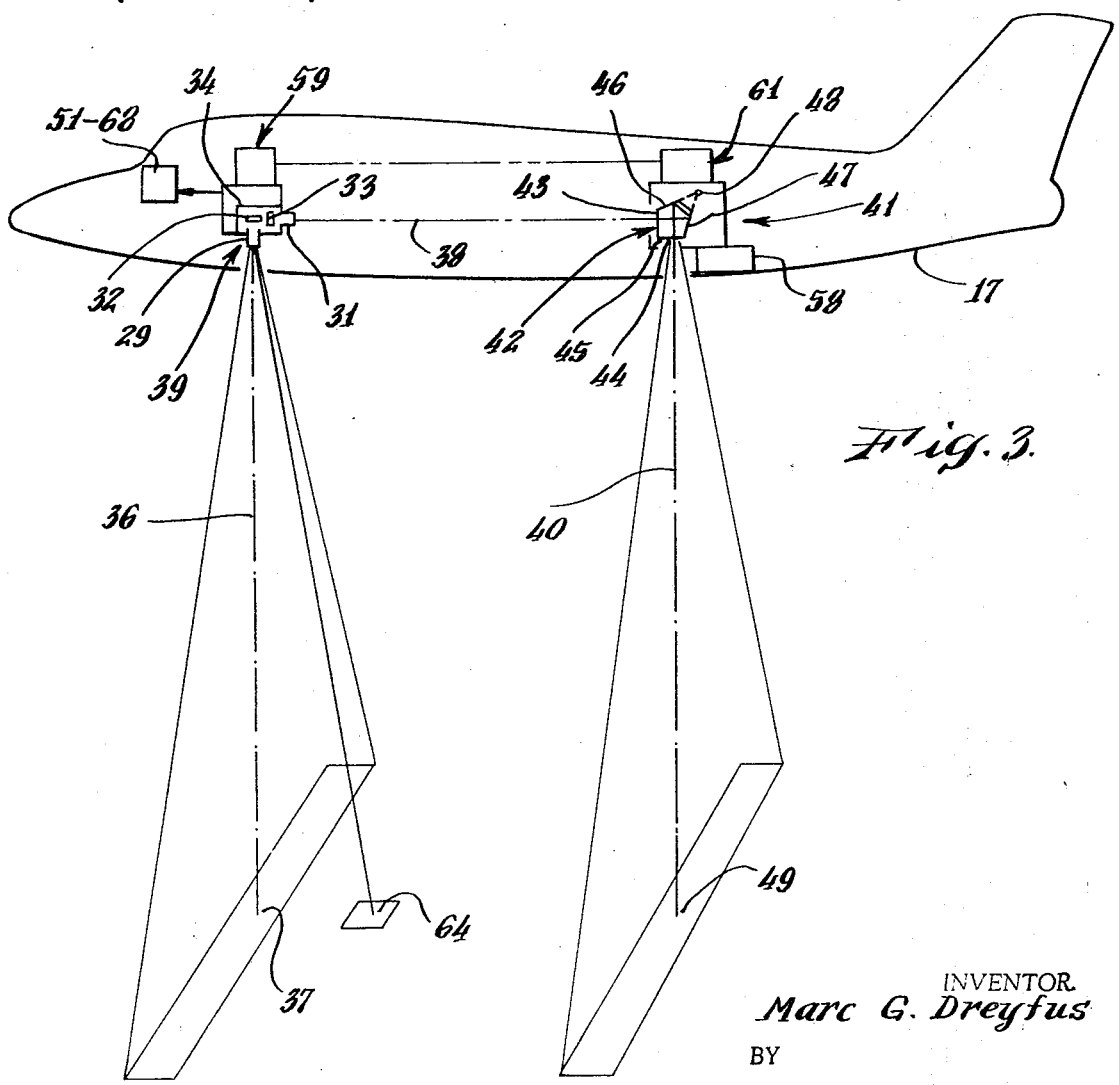
Fig. 3.
INVENTOR.
Marc G. Dreyfus
BY
Mattern, Ware & Davis
ATTORNEYS.

INVENTOR.
Marc G. Dreyfus
BY
Mattern, Ware & Davis
ATTORNEYS.

United States Patent Office 3,525,568
Patented Aug. 25, 1970

3,525,568
AIRBORNE ELECTRO-OPTICAL SYSTEMS AND APPARATUS FOR INDICATING TRUE AIRCRAFT VELOCITY AND ALTITUDE
Marc G. Dreyfus, 40 Walter Lane, Stamford, Conn. 06902
Filed Dec. 11, 1967, Ser. No. 689,665
Int. Cl. G01p 3/68
U.S. Cl. 356—28         6 Claims

ABSTRACT OF THE DISCLOSURE

Airborne electro-optical systems and apparatus for indicating the true velocity and altitude of an aircraft relative to the ground, incorporating two intensity-responsive radiation detectors firmly anchored to a common frame in the aircraft and independently aligned to receive radiation from orthogonal directions, one detector being aimed downward and the second being aimed along the line of the aircraft's heading, with pentaprism means interposed in the line of sight of the second detector and spaced at a substantial distance therefrom to redirect the second detector's line of sight downward in a direction parallel to the downward line of sight of the first detector, with output signal amplification, recording, memory storage, reading, variable time-delay signal correlation and indicating means for comparing the instantaneous overall or scanned radiaton intensity incident upon the separate detectors at variable time intervals to select the time interval producing maximum signal correlation, corresponding to the true instantaneous ground-speed of the aircraft; and airborne systems and apparatus combining the foregoing with conventional angular velocity responsive systems indicating the instantaneous ratio of aircraft velocity to aircraft altitude, or V/H, thereby indicating true instantaneous aircraft altitude.

BACKGROUND OF THE INVENTION

Airspeed indicators showing aircraft velocity relative to the body of air through which an aircraft travels provide only a rough approximation of true aircraft velocity or groundspeed in the direction of flight, because of the high windspeeds and high altitude jetstream velocities common at aircraft operating altitudes. Accordingly, aircraft groundspeed is customarily deduced a postiori from successive position versus elapsed time comparisons derived from ground radio beacons, celestial navigation, or visual observation of landmarks on the ground.

Some aircraft are equipped to determine aircraft velocity relative to the ground by measuring Doppler shift in a radar beacon signal transmitted from the aircraft toward the ground, and reflected by the ground back toward the aircraft. However such airborne Doppler radar installations are costly, and they require radiation of detectable levels of electromagnetic radiation by the aircraft, which may be undesirable in military aircraft operations.

For many years systems have been proposed for indicatng approximatons of true aircraft velocity. Some of these systems have employed moving optical images of the terrain passing beneath the aircraft, with the speed of image movement being measured directly or by electrical signal chopping, matching or heterodyning techniques to provide an indication of the angular velocity of the relative movement of aircraft and terrain, giving the ratio of velocity to altitude, or V/H. Such systems are disclosed or suggested in U.S. Pats. 2,772,479, 3,006,325 and 3,057,071, for example. By comparison with altimeter altitude, approximate ground speed was indicated by such systems, but errors inherent in altimeters dependent upon atmospheric pressure measurements severely limit the precision of such systems for indicating true aircraft velocity.

As a result, an aircraft velocity indicating system purporting to be independent of aircraft altitude has been proposed in U.S. Pats. 2,967,449 and 2,882,783, suggesting the use of separate radiant energy responsive detectors, aimed downward with vertical and parallel optical axes, and "preferably mounted as far longitudinally apart as possible," fixedly mounted at fore and aft stations on the aircraft," such as "fore and aft blisters on the underside of the aircraft, and at as widely longitudinally spaced locations as in convenient." By measuring the time delay between the appearance of corresponding portions of the terrain image in the narrow field of view of these successive detectors, as by variable time delay correlation of magnetic drum-stored signal records, a time interval directly proportional to true aircraft velocity or groundspeed should be derived.

As a practical matter, this parallel dual line of sight detector system has proved impossible to achieve because of the continuing flexure and vibratory movement of the various portions of the airframe.

For this reason, such dual line of sight systems have never reached practical utilization. In order to give some idea of the parallelism required, it may be noted that a typical aircraft might carry detectors spaced apart by at least ten feet, and might be operating at an altitude of 20,000 feet. In order to measure the aircraft's linear velocity to an accuracy of 1%, the fore and aft separation between the respectve detectors' fields of view on the ground must be known to an accuracy of 1%. Indeed, 0.1% accuracy is much preferred, if it can be attained. If airframe flexure produces forward or aft tilting motion of either detector relative to the other by 10/20,000 radian or 100 seconds of arc, both detectors will observe the same point on the terrain; hence the detectors' optical axes must be kept parallel with a precision of 1% of 100 seconds, or one second of arc, in order to measure the aircraft's linear velocity to an accuracy of 1%. For 0.1% accuracy, parallelism within $5 \times 10^{-7}$ radians or 0.1 second of arc is required. The achievement of such theoretical parallelism with ordinary airframe construction is a practical impossibility.

SUMMARY OF THE INVENTION

The airborne velocity and altitude measurement and indicating systems of the present invention are capable of successful and accurate indication of true aircraft velocity with parallel, dual line of sight detectors. This invention overcomes the deleterious effect of airframe flexure continuously and automatically, maintaining the alignment and linear separation of detectors' individual terrain image areas with the precision required to provide velocity and altitude indications accurate to 0.1%.

The basic concept of my invention is my discovery that the flexure of an aircraft structural member ten feet or more in length should be replaced by the rigidity of a ten-foot long beam of light. I have achieved this rigidity by mounting both of my detectors firmly and rigidly on a common frame, with their optical axes perpendicular: one detector is aimed downward, while the other detector is aimed along the direction of the aircraft's heading, forward or aft. At a point substantially spaced along the second detector's line of sight, an optical element known as a pentaprism is interposed to re-direct that line of sight downwardly in exact parallelism with the downward line of sight of the first detector.

A pentaprism has the property of deflecting beams of light through precisely a right angle regardless of minor variations in the pentaprism's orientation, such as those caused by upward and downward flexing of an aircraft fuselage. In order to compensate for twisting or torsional flexure of the fuselage, I have combined with this device a pentaprism servorotating system repsonsive either to reduced signal correlation caused by fuselage twist, or to changes in the intensity of polarized light produced by fuselage twist-induced relative angular shifting of two interposed polarizers.

Accordingly, a principal object of the invention is to provide airborne systems and apparatus capable of accurately indicating the true velocity or groundspeed of an aircraft operating over either land or water at a wide range of altitudes.

Another object is to provide such systems capable of indicating also the true altitude of the aircraft above the underlying terrain, independently of atmospheric pressure measurements and without the use of detectable electromagnetic radiation emanating from the aircraft.

A further object is to provide such systems capable of determining and indicating true aircraft velocity and true aircraft altitude to an accuracy of 0.1%.

Another object is to provide such systems which are passive or non-radiating and jam-proof, and which are capable of both day and night operation.

Other and more specific objects will be apparent from the features, elements, combinations and operating procedures disclosed in the following detailed description and shown in the drawings.

THE DRAWINGS

FIG. 1 is a schematic diagram of prior art airborne V/H indicating system of the kind shown in U.S. Pats. 2,772,479, 3,006,235 and 3,057,071;

FIG. 2 is a similar schematic diagram of the proposed airborne velocity indicating system of the kind shown in U.S. Pats. 2,882,783 and 2,967,449;

FIG. 3 is a schematic diagram showing a system incorporating a preferred embodiment of the present invention mounted in an aircraft and viewing two discrete regions of the underlying terrain;

Prior art systems

Figure 4:
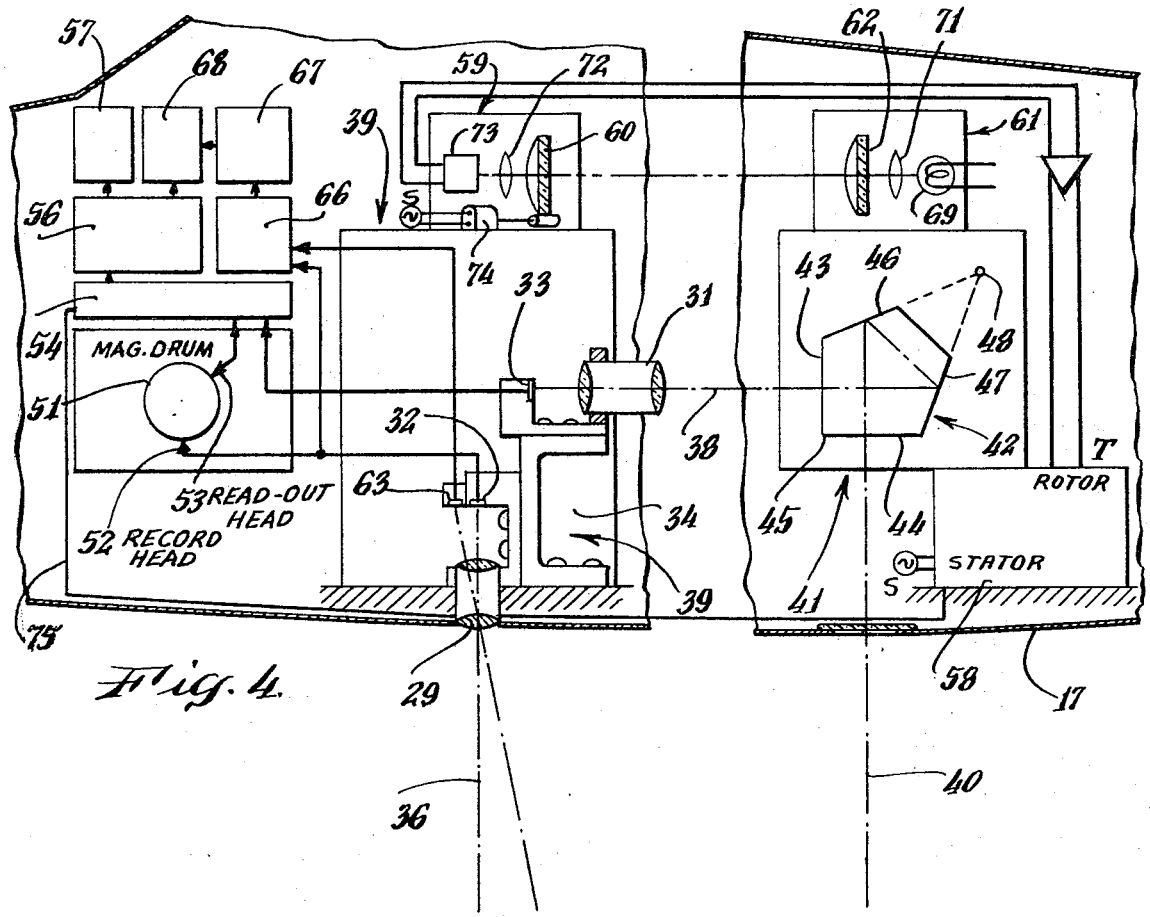
FIG. 4 is an enlarged schematic diagram of the embodiment of FIG. 3, showing the various component sub-assemblies.

In prior art airborne systems for indicating the V/H ratio or the angular velocity at which terrain is passing beneath the aircraft, of the type shown schematically in FIG. 1, an aerial camera lens 10 generates an image 11–12 which is similar in shape and prooprtions to an image region 13–14 of the terrain 16 below the aircraft 17. For example, the angle A in FIG. 1 subtended by points 13 and 14 at the lens 10 equals the angle A' subtended by points 11 and 12 at the same lens 10. The linear velocity of the image 11–12 in this aerial camera is proportional to the linear velocity of the terrain 16 beneath the aircraft 17. While the image velocity can be measured, this value cannot be converted accurately into terrain velocity since the proportionality constant is unknown.

In prior art airborne systems of the kind shown schematically in FIG. 2, aircraft velocity relative to the terrain 16 could theoretically be measured, since this arrangement employs two separate airborne cameras 18 and 19 having respective optical axes 21 and 22 vertical and strictly parallel. In such a system, a terrain point 23 is imaged by camera 18 at an image point 24 at a given instant of time and a rearward terrain point 26 is simultaneously imaged by camera 19 at an image point 27. As the aircraft moves forward, camera 19 images terrain point 23 a brief interval after camera 18; if it is measured with sufficient precision, this brief interval could be divided by the known distance 28 between cameras 18 and 19 to yield a direct measure of true aircraft velocity V.

Because of the stringent parallelism requirement imposed upon such a parallel dual line of sight system, normal bending and vibratory flexure of the aircraft fuselage introduces errors so large that the systems of FIG. 2 are not practical.

The pentaprism systems of this invention

As shown in FIGS. 3 and 4, the systems of this inven- incorporate a particular form of beam-redirecting optical element known as a pentaprism. For a full discussion of pentaprism means, including unitary, homogeneous glass block pentaprisms and penta reflectors having two facing mirrors angularly offset by the 45-degree included pentaprism angle, see Jacobs, Fundamentals of Optical Engineering (McGraw-Hill, 1943), pages 259–262. As there stated, regardless of the angle of incidence, these pentaprism means deviate or re-direct the incident light beam through an angle of precisely 90 degrees in the principal plane defined by the incident light beam and a perpendicular to the vertex axis at which the facing 45-degree offset penta mirrors or pentaprism reflecting surface planes intersect.

In the preferred systems of this invention, two telescopes 29 and 31 are used, having radiation detectors 32 and 33 positioned in their respective image planes; telescopes 29 and 31 and detectors 32 and 33 are all firmly and immovably anchored to the same unitary supporting base or frame 34, as indicated in the figures. As there shown, the first telescope 29 has its optical axis 36 directed vertically downward toward a terrain point 37 directly below the aircraft 17 when it is in level flight. Terrain point 37 is therefore imaged by telescope 29 at the center of detector 32.

The second telescope 31 and its detector 33 are likewise anchored to frame 34, with the optical axis 38 of telescope 31 aimed along the flight axis or heading of the aircraft 17. Telescopes 29 and 31, detectors 32 and 33 and their supporting frame 34 thus form together a detector unit 39.

A pentaprism unit 41 is interposed in optical alignment at a predetermined point on the second optical axis 38 of telescope 31. Unit 41 incorporates a pentaprism 42 having an emergent face 43 and an incident face 44 precisely perpendicular to each other, and intersecting along a right angle edge 45. Emergent face 43 lies in a transverse or athwartships plane perpendicular to optical axis 38, while incident face 44 lies in a normally horizontal plane, facing the terrain 16. As shown in FIGS. 3 and 4, pentaprism 42 has the effect of folding or deviating second optical axis 38 exactly 90 degrees from its original direction, to a new downward direction 40 precisely parallel to first optical axis 36 of downwardly aimed telescope 29. Pentaprism 42 achieves this result because its silvered reflecting surfaces 46 and 47 lie in planes intersecting the perpendicular faces 43 and 44 along lines parallel to edge 45, forming internal obtuse angles of 112.5 degrees therewith, and surfaces 46 and 47 themselves lie in planes which intersect along another parallel, athwartships axis 48. Thus the "principal plane" of pentaprism 42 is defined by original optical axis 38, and it is perpendicular to axis 48; it therefore coincides with and contains redirected second optical axis 40 as well as first optical axis 36.

This system design obviates the prior art requirement for an infinitely rigid 10-foot girder incorporated in the aircraft fuselage, and replaces this unattainable goal with the far more reasonable requirement of a clear, tubular line of sight along optical axis 38 roughly four inches in diameter and ten feet long. If desired, part of this line of sight may be positioned outside the aircraft fuselage; shorter spans can be used at the expense of a proportionate reduction in the accuracy of the velocity determination.

The main effect of fuselage flexure upon this system is to move the pentaprism 42 out of the path of the light beam. Hence it is necessary to make the pentaprism's acceptance aperture at emergent face 43 somewhat larger than the instantaneous beam diameter required by the horizontal telescope 31 at the location of pentaprism 42, in order to avoid vignetting artifacts.

A secondary effect of fuselage flexure upon this system results from torsional or "twisting" vibration or oscillation of the fuselage, causing terrain point 49 on second, re-directed optical axis 40 to be deflected laterally relative to the ground track of terrain point 37 on first optical axis 36. By servo-rotating pentaprism 42 about second optical axis 38, which is substantially parallel to the twist axis of the aircraft fuselage, maximum correlation between the output signals of detectors 32 and 33 can be achieved.

System parameters

The preferred embodiment of the invention is capable of day or night operation over land or water, which normally radiates about $10^{-2}$ watts/cm.$^2$ sr. both day and night. In the daytime this radiation is dominated by reflected sunlight which is concentrated at wavelengths near 1 micron. Available detectors for this wavelength range have detectivities in excess of $10^{12}$ c.p.s.$^{1/2}$ cm./watt. During nighttime, terrain radiation is dominated by thermal self-emission which is concentrated at wavelengths near 10 microns. Available detectors for these longer wave-lengths have detectivities of only $10^{11}$ c.p.s.$^{1/2}$ cm./watt unless the photon noise in the thermal background is reduced by limiting the instantaneous field of view with cryogenic field stops. Thermal self-emission in the 10 micron wavelength region is also present in the daytime. Accordingly the preferred systems capable of day and night operation employ the 10 micron region of the infrared spectrum.

For such 24-hour operation, two telescopes 29 and 31 with 10 cm.$^2$ entrance pupils and $10^{-7}$ steradian fields of view are most suitable. These telescopes deliver about $10^{-8}$ watts of 10 micron radiation to the detectors 32 and 33 both night and day. A radiation detector optimized for the 10 micron spectral region with a 1 second time constant yields a signal to noise ratio of $10^3$. This signal to noise ratio is adequate to determine aircraft velocity to 0.1% accuracy, provided the two ground patches viewed by the two telescopes do not overlap.

The $10^{-7}$ steradian field of view of each telescope 29 and 31 is preferably limited by an elongated transverse aperture in the telescope's image plane, and is rectangular in shape with a 10:1 aspect ratio, as indicated in FIG. 3, with its long side perpendicular to the aircraft heading. Hence the view angle along the flight line is $10^{-4}$ radian, and spans 10 feet on the ground from an altitude of 100,000 feet. The two telescopes are preferably spaced about 10 feet apart along second optical axis 38 in the direction of flight, in order to view separate patches of ground from altitudes up to 100,000 feet.

The separation of the ground patches must be known to an accuracy of 01.% or 0.1 inch in order to determine aircraft velocity to 0.1% accuracy. This requirement imposes the restriction of parallelism of optical axes 36 and 40 within 0.02 second of arc, which can only be achieved by anchoring telescopes close together rigidly to a single, common, unitary frame 34, and employing a pentaprism unit 41 to re-direct perpendicular optical axis 38 to a direction accurately parallel to axis 36.

Initial acquisition mode

Identification of the delay time required for optimum correlation of the output signals of detectors 32 and 33 corresponding to true aircraft velocity may be difficult initially under certain conditions, such as initial operation in a low-flying aircraft when the system is first turned on. In this case a relatively noisy correlation signal may impede selection of the correct delay time. This start-up difficulty may be minimized in various ways to facilitate initial correlation. For example, the two fields of view can be temporally overlapped by sweeping the time delay value rapidly through a range consistent with indicated airspeed ±100 m.p.h. until a clear correlation signal is generated. Alternatively the two fields of view can be spatially overlapped by defocusing one or both of the slits which define the fields of view. This defocusing can be achieved by interposing a weak positive lens in front of the telescope lens.

Correlation of detector output signals

Figure 5:
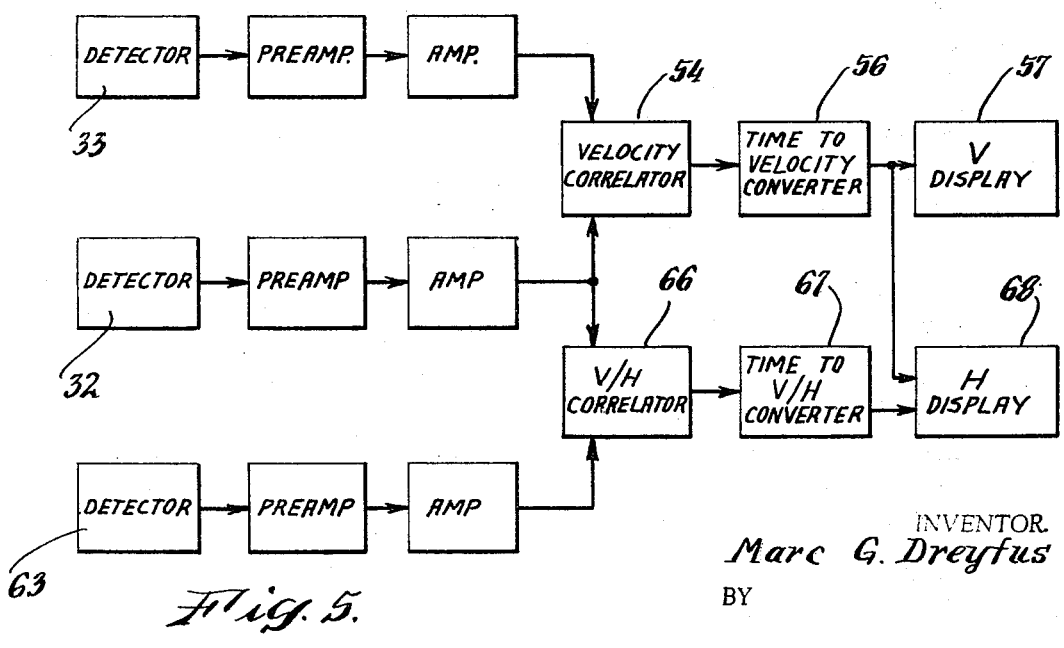
FIG. 5 is a detailed schematic block diagram of the correlation and information circuitry incorporated in the same embodiment of the invention.

As shown in the schematic block diagrams of FIGS. 4 and 5, the outputs of the two detectors 32 and 33 are compared on a controlled variable velocity magnetic tape loop or drum 51, preferably having one recording head 52 recording the output signal from first detector 32, and one read-out head 53 providing a delayed reproduction of the first detector's output signal to be matched with the instantaneous output signal of the second detector 33. By controlling the speed of drum 51, a velocity correlator 54 determines the time delay yielding maximum correlation, averaged over a convenient system time constant such as one second. This time delay is then converted to a calibrated velocity value in velocity converter 56, whose output is then delivered to a cockpit velocity display unit 57. The block diagram of FIG. 4 indicates the relationship of the units 54, 56, 57, 66, 67 and 68, and these units are identified by the legends on the schematic diagram of FIG. 5.

Velocity correlator 54 may be a unit similar to Bolsey Associates' IMC Image Motion Compensator, for example. This unit generates an image of the terrain with a lens located in a vehicle aloft. As the vehicle moves above the ground, the image moves correspondingly. The image is scanned repeatedly by a rotating mirror system, and the intensity level at various points in the image is converted by a radiation detector and amplifier into an electrical output signal. At the beginning of a cycle of IMC operation, the signal generated by one complete image scan is stored on a small magnetic memory drum. Subsequent image scans are processed by a logic circuit which measures their degree of similarity to the stored scan. The similarity is maximized by a translating mirror system which moves the image to keep it registered with the stored image; thus the ground image is locked in registration with a fixed stored image until the translating mirror reaches the limit of its mechanical travel. The translating motion required to lock the image is transmitted by the mirror servo to the aerial camera in which the image motion is to be compensated.

The level of performance that has been achieved with this approach to image motion compensation can be characterized by noting that the IMC systems which Bolsey Associates built under subcontract to Eastman Kodak Company for use on NASA's Lunar Orbiter Program consistently moved the camera film in registration with the lunar image to an accuracy of better than 3 microns while in orbit around the moon.

Fuselage twist compensation

If the aircraft fuselage twists by a large angular amount, low signal correlation may be observed due to lack of overlap in the ground-tracks of the two fields of view. Temporal searching by sweeping variations in delay time will not improve the correlation degradation produced by this fuselage twisting, but spatial defocusing will reduce this degradation. Alternatively, the twist compensator servosystem 58 shown in FIGS. 3 and 4 serves to rotate pentaprism 42 about second optical axis 38, substantially parallel to the fuselage twist axis, to reestablish correlation. The servo control signal used for this correction can be either the resultant degree of correlation, or an independent control loop such as that shown in FIGS. 3 and 4, employing a photocell unit 59, rigidly secured to the detector unit 39 and integral with the frame 34 anchoring the two telescopes 29 and 31 and incorporating a rotatable polarizer 60; photocell unit 59 cooperates with a polarized light source 61, including a fixed polarizer 62, rigidly secured to the pentaprism unit 41.

The source 61 incorporates a lamp 69, a collimating lens 71 and the fixed polarizer 62, all in alignment along an optical axis substantially parallel to axis 38, directed toward photocell unit 59, which includes the rotatable polarized 60 and a collector lens 72 interposed in optical alignment along the same axis before a photocell 73.

An input S is a sine-wave source of AC power connected to drive a synchronous motor 74 driving the rotatable polarizer 60. Input S is also connected to power the stator of the servomotor 58, which rotates the pentaprism unit 41 and the polarized light source rigidly mounted thereon. An output signal T from photocell 73 is amplified and connected to power the rotor of servomotor 58. Hence this servomotor will rotate the units 41 and 61 to maintain their rotational orientation about axis 38 with respect to the windings of the synchronous motor 74 in the photocell unit 59. Twisting motion of the aircraft fuselage produces corresponding increases or decreases in the phase angle of the output signal of photocell 73, depending upon the direction of the twisting motion, actuating compensating opposite movement of servosystem 58 to maintain the principal plane of pentaprism 42 in coincidence with first optical axis 36 of the first telescope 29. If desired, degradation of the correlation achieved in correlator 66 between the output signals of detectors 32 and 33 may be employed to generate a voltage connected by a degradation compensator line 75 (FIG. 4) to drive the rotor of servomotor 58. Degradation line 75 may be employed either to supplement or replace the polarized light units 59–61.

A pentaprism is one example of a larger class of mirror systems which deflect a light beam by a fixed angular amount which is invariant with respect to rotation of the mirror system. Another example of such a mirror system is the common parade-viewing periscope which consists of two parallel flat mirrors mounted at opposite ends of a tube and tilted 45° with respect to the tube axis. In general, any mirror system with an even number of mirrors exhibits the required rotational insensitivity. The angular relationship of the mirrors used determines the angle between the incident and emergent light beams, and the relative size of the maximum beam diameter which can be transmitted without vignetting. In the present case, axes 36 and 40 must be kept parallel, and the included angles between these axes and the axis 38 are supplementary, totalling 180°. Accordingly, the included angle between surfaces 46 and 47 intersecting at axis 48 is selected so that when it is doubled and added to the inclination angle of telescope 31 relative to axis 36, the total will equal 180° as in the perpendicular case illustrated in FIGS. 3 and 4, where $2 \times 45° + 90° = 180°$.

Indication of true aircraft altitude

The first telescope 29 and its detector 32 may be employed to measure relative angular terrain velocity or the V/H ratio by the use of a secondary detector 63 having a second scanning aperture in the focal plane of the vertical first telescope 29, positioned so that it views a point 64 in a patch of ground which is ½ milliradian behind the patch containing first terrain point 37. The signal from the secondary detector 63 will match the signal from the first detector 32 delayed by a short time interval which is proportional to the relative angular terrain velocity, or the V/H ratio. The output signals of detectors 32 and 63 may be amplified and correlated in a V/H correlator 66, and converter 67, as shown in FIG. 5, and the instantaneous V/H ratio may be combined with the instantaneous true aircraft velocity V indicated by the velocity converter 56 to yield true aircraft altitude with the same degree of accuracy inherent in the system as a whole. The resulting altitude value may be shown visually on a cockpit altitude display 68, as in FIG. 5.

By the use of such pentaprism means as the glass block pentaprism 42 in combination with two orthogonally aimed telescopes 29 and 31 and their respective radiation detectors 32 and 33 mounted rigidly on the single, common unitary frame 34, I have achieved the exceptionally high degree of parallelism which is essential for useful operation of parallel dual line of sight double detector systems for determination of true aircraft velocity. The orientation of pentaprism 42 with its principal plane coinciding with both of the parallel optical axes 36 and 40 automatically minimizes or eliminates the degrading effects of fuselage flexure, and degradation produced by fuselage twisting motion is successfully counteracted by the twist compensating servosystem 58.

While the other objects of the invention are efficiently achieved by the preferred forms of the invention described in the foregoing specification, the invention also includes changes and variations falling within and between the definitions of the following claims.

I claim:

1. An airborne device for indicating the true velocity of an aircraft relative to the terrain passing below comprising:

a first telescope mounted in the aircraft having a first optical axis directed vertically downward toward a first terrain point directly below the aircraft, a second telescope closely adjacent to the first telescope and having a second optical axis directed perpendicular to the first optical axis along the aircraft heading, separate first and second radiation detector means being respectively mounted in the respective image plane of each telescope, a unitary common supporting frame mounted in the aircraft and firmly anchoring both telescopes and both detectors against relative movement, pentaprism means having two reflecting plane surfaces facing each other and angularly displaced at an angle of exactly 45 degrees to intersect along an axis of intersection and having a central principal plane perpendicular to said axis of intersection, with the pentaprism means being positioned in optical alignment with the second telescope and spaced a substantial distance therefrom along said second optical axis with said central principal plane coinciding with both the first and the second optical axes, redirecting the second optical axis downward precisely parallel to the first optical axis toward a second terrain point displaced from the first terrain point along the aircraft's heading, and time delay correlation means connected to receive the output signals from both detectors and to determine the time delay producing the maximum correlation between the varying radiation intensity signals corresponding to the true instantaneous groundspeed of the aircraft.

2. The invention defined in claim 1, including a pentaprism servorotating device mounted in the aircraft supporting the pentaprism and connected to rotate the pentaprism about the second optical axis by a predetermined angle to counteract angular twisting rotation of the aircraft fuselage.

3. The invention defined in claim 2, wherein the servorotating device is actuated in response to degradation of the detector signal correlation.

4. The invention defined in claim 2, wherein the servorotating device is actuated by a polarizer lamp and photocell assembly mounted on the frame and the pentaprism mounting and connected to detect relative angular twisting motion therebetween.

5. The invention defined in claim 1, further including a V/H system capable of measuring the V/H ratio of aircraft velocity to aircraft altitude, having a V/H signal output combined with a true velocity signal output generated by the correlation means to provide an instantaneously varying true aircraft altitude signal output.

6. An airborne device for indicating the true velocity of an aircraft relative to the terrain passing below comprising:
  a first telescope mounted in the aircraft having a first optical axis directed vertically downward toward a first terrain point directly below the aircraft,
  a second telescope closely adjacent to the first telescope and having a second optical axis directed perpendicular to the first optical axis along the aircraft heading, separate first and second radiation detector means being respectively mounted in the respective image plane of each telescope,
  a unitary common supporting frame mounted in the aircraft and firmly anchoring both telescopes and both detectors against relative movement,
  rotationally insensitive mirror means having two reflecting plane surfaces facing each other and angularly displaced at an angle to intersect along an axis of intersection and having a central principal plane perpendicular to said axis of intersection, with the mirror means being positioned in optical alignment with the second telescope and spaced a substantial distance therefrom along said second optical axis with said central principal plane coinciding with both the first and second optical axes, redirecting the second optical axis downward precisely parallel to the first optical axis toward a second terrain point displaced from the first terrain point along the aircraft's heading, and
  time delay correlation means connected to receive the output signals from both detectors and to determine the time delay producing the maximum correlation between the varying radiation intensity signals corresponding to the true instantaneous groundspeed of the aircraft.

References Cited

UNITED STATES PATENTS

| 2,772,479 | 12/1956 | Doyle | 356—28 |
| 2,882,783 | 4/1959 | Blackstone | 356—28 |
| 2,958,253 | 11/1960 | Blackstone | 356—28 |
| 2,967,449 | 1/1961 | Weiss | 356—28 |
| 3,006,235 | 10/1961 | Brandon | 356—28 |
| 3,057,071 | 10/1962 | Sinn | 356—28 |
| 3,144,497 | 8/1964 | Hamilton | 356—28 |

OTHER REFERENCES

Miller, B.: IR Velocity/Height Compute Studied, Aviation Week, 72(21), pp. 81–82, May, 23, 1960, TL 501.A8.

RODNEY D. BENNETT, JR., Primary Examiner

T. H. TUBBESING, Assistant Examiner